United States Patent [19]
Davidson

[11] Patent Number: 6,026,854
[45] Date of Patent: Feb. 22, 2000

[54] COMPRESSED GAS REGULATOR WITH FLOW CONTROL AND INTERNAL GAUGE

[76] Inventor: Gilbert Davidson, 9205 Huntcliff Trace, Atlanta, Ga. 30350

[21] Appl. No.: 09/329,266

[22] Filed: Jun. 28, 1999

Related U.S. Application Data

[63] Continuation of application No. 09/213,441, Dec. 16, 1998.
[51] Int. Cl.[7] ...................................................... F16K 3/32
[52] U.S. Cl. ............................ 137/547; 137/613; 251/206
[58] Field of Search ..................................... 137/547, 550, 137/613, 505.25; 251/206

[56] References Cited

U.S. PATENT DOCUMENTS

| | | | |
|---|---|---|---|
| 3,638,675 | 2/1972 | Dockery | 137/550 |
| 3,834,416 | 9/1974 | Parkison | 137/550 |
| 3,978,705 | 9/1976 | Pearce et al. | 72/325 |
| 4,241,896 | 12/1980 | Voege | 251/206 |
| 4,643,215 | 2/1987 | Phlipot et al. | 137/15 |
| 4,655,246 | 4/1987 | Phlipot et al. | 137/505.25 |
| 4,898,205 | 2/1990 | Ross | 137/505.25 |
| 4,909,476 | 3/1990 | Messick | 251/206 |
| 5,485,983 | 1/1996 | Voege et al. | 251/206 |
| 5,509,407 | 4/1996 | Schuler | 137/550 |

*Primary Examiner*—Stephen M. Hepperle
*Attorney, Agent, or Firm*—Kyle S. Brant

[57] ABSTRACT

A compressed gas regulator with integral flow meter is disclosed. The regulator includes pressure reducing section and a flow control section, as well as, a Bourdon tube gauge disposed within the protective surround of the regulator body to prevent physical damage to the gauge. The Bourdon tube is mounted on a gauge adapter that provides for rotation of the tube within the regulator body, yet maintaining a gas seal with the high pressure gas supply. The gauge adapter provides a means for fluidly communicating the high pressure level to the Bourdon tube, yet allowing rotation of the Bourdon tube for zeroing and calibration purposes. An indicator ring, also disposed within the regulator body, is mounted on the Bourdon tube so that the pressure level is readily ascertained by viewing the indicator ring through an aperture in the regulator body. An improved flow meter or flow control device is also disclosed that includes a filter and coined flow aperture plate that is economical to manufacture yet provides improved functionality in filtering particulates from the gas emerging from the flow meter.

11 Claims, 6 Drawing Sheets

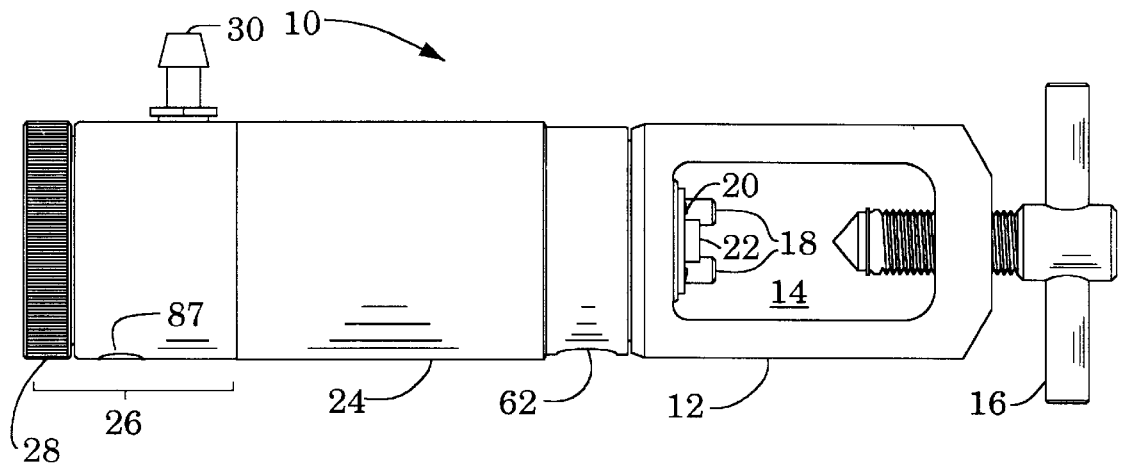
Fig. 1
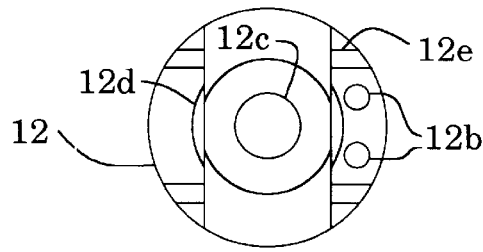
Fig. 1a
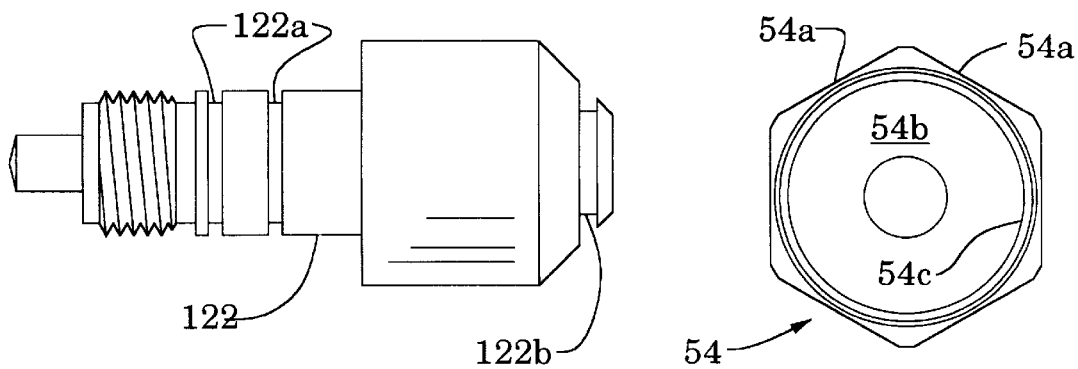
Fig. 13                    Fig. 11

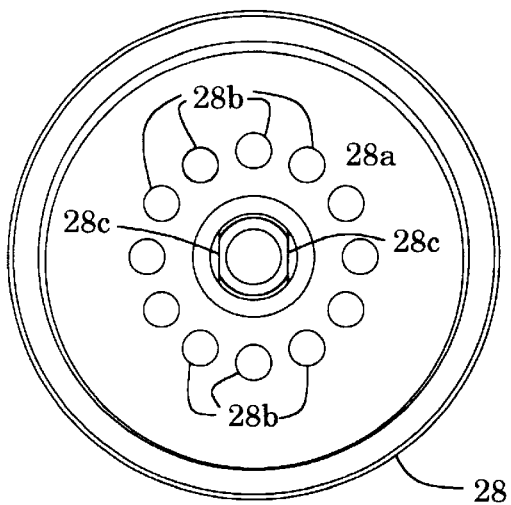
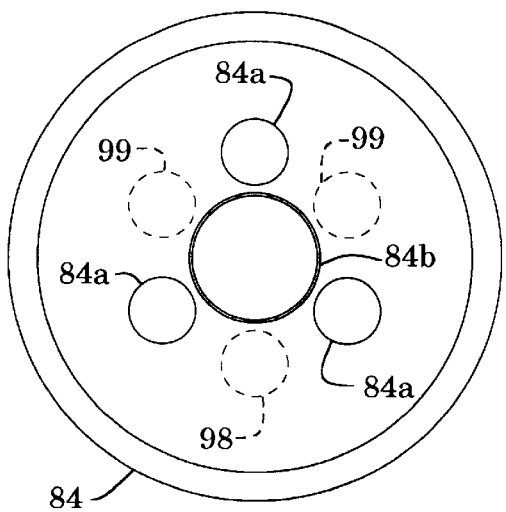
Fig. 6        Fig. 7
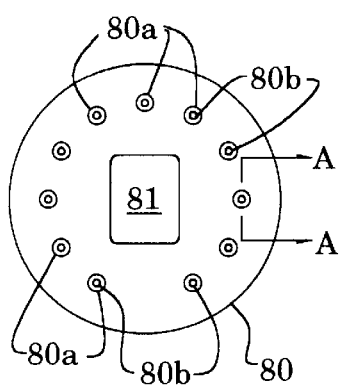
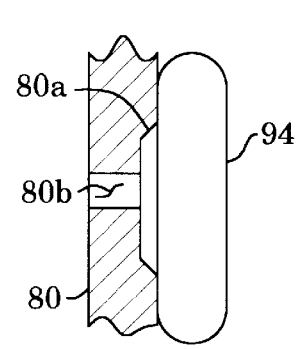
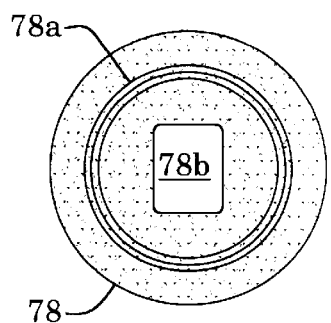
Fig. 8        Fig. 9        Fig. 10

COMPRESSED GAS REGULATOR WITH FLOW CONTROL AND INTERNAL GAUGE

RELATED APPLICATION INFORMATION

This application is a continuation of my pending application Ser. No. 09/213,441, filed Dec. 16, 1998 pending.

FIELD OF THE INVENTION

This invention relates to gas flow control devices and, more particularly, to a compact, regulated gas flow control valve.

BACKGROUND OF THE INVENTION

Precisely calibrated gas-metering devices are commonly used in the medical, emergency and home health care industries for delivering oxygen to patients in need thereof. Nearly all regulators are attached to a high pressure oxygen tank via standardized mechanical connections set forth in the Compressed Gas Associations standards.

Millions of people suffer from chronic obstructive pulmonary disease. Sixty percent of them are treated and receive supplemental oxygen in their homes. Ambulatory patients are provided with portable oxygen systems. The most common system consists of aluminum or steel cylinders ranging in capacity from 160 to 660 liters containing oxygen at 2000 psi. The cylinder is fitted with an off/on post valve to which an oxygen regulator is attached. The regulator reduces the gas pressure from 2000 psi to 50 psi typically. In addition, most regulators include a flow control section that meters the gas to the patient at a prescribed or desired flow rate. Nearly all of the regulators are fitted with an external pressure gauge that displays the pressure within the cylinder at all times. The gauges are fragile, and even though fitted with protective rubber surrounds, are easily broken since the protrude from external surface of the regulator body. When a gauge is broken, it is necessary for the home care provider to make an unscheduled visit to the patient's home to replace the regulator. The large number of unscheduled visits is a large expense to the home care provider industry.

Many regulator devices are presently known that provide such functionality. A variety of such devices are manufactured by Flotec, Inc. of 7625 West New York Street, Indianapolis, Ind. 46214. Many styles of regulator products are produced in the U.S. One common style of regulator is the "unibody" regulator design. The unibody design is typified by a single substantially cylindrical assembly including a yoke at one end for mounting the regulator on a high pressure tank and a regulator body integral with the yoke that includes a pressure reducing section and a flow control section. Typically, these devices also include a pressure gauge that is screwed into a threaded hole in the outer surface of the cylindrical body.

Oxygen tanks onto which the pressure regulator/flow control devices are attached are quite heavy and easily tip over. When an oxygen tank tips over it is not uncommon for the pressure gauge attached to the external surface of the regulator device to suffer damage. An improvement in regulator design that minimizes the likelihood of damage to the pressure gauge is desired.

Further, pressure regulator/flow control devices are constructed with machined metal parts that are subject to surface wear. Very fine particles of metal are created when the internal moving components of the regulator make contact with each other. It is thus a further desired feature to minimize the likelihood that such fine metal particles are introduced into the gas flow provided to the user of such devices.

Therefore, an improved compressed gas regulator/flow control device with an internal gauge and improved particulate filtering is desired.

SUMMARY OF THE INVENTION

A gas regulator including an internal gauge, according to one aspect of the present invention, comprises a first body having an inlet for receiving gas at high pressure from a gas source thereof and a fluid passage in fluid communication with the inlet that extends through the first body, the first body further including an outlet in fluid communication with the fluid passage, a second body having an inlet, a pressure reduction cavity, a first fluid passage in fluid communication with the inlet and the pressure reduction cavity, a gauge cavity, a viewport aperture fluidly communicating with the gauge cavity, and a second fluid passage in fluid communication with the first fluid passage and the gauge cavity, a helical coil Bourdon tube having a sealed end and an open end and disposed within the gauge cavity and wherein the open end of the Bourdon tube is fluidly connected to the second fluid passage where the second fluid passage communicates with the gauge cavity, a pressure indicator disposed in the gauge cavity and attached to the Bourdon tube, and wherein the pressure indicator is viewable through the viewport aperture, pressure reducing means including a low pressure outlet disposed within and fluidly sealing the pressure reduction cavity, the pressure reducing means reducing the gas pressure in the pressure reduction cavity to a predetermined lower pressure and supplying the predetermined lower pressure gas to the low pressure outlet, clamp means for attaching the first body to the gas source so that high pressure gas is supplied to the inlet of the first body, and means for attaching the first body to the second body, the means for attaching including means for fluidly connecting the outlet of the first body to the inlet of the second body.

One object of the present invention is to provide an improved gas regulator with flow control capability.

Another object of the present invention is to provide an improved gas regulator with an internal gauge that is securely protected from damage.

Still another object of the present invention is to provide a more economically produced gas pressure regulator with flow control.

Yet another object of the present invention is to provide an improved flow metering device.

These and other objects of the present invention will become more apparent from the following description of the preferred embodiments.

BRIEF DESCRIPTION OF THE DRAWINGS

FIG. 1 is a front elevational view of a compressed gas regulator with flow control and internal gauge according to the present invention.

FIG. 1a is an end view of the device of FIG. 1 with the t-handle and dowel pins removed.

FIG. 6 is an end view of the knob 28 of FIG. 1.

FIG. 7 is an end view of the flow meter body 84 of FIG. 5.

FIG. 8 is an end view of the rotor cup 80 of FIG. 5.

FIG. 9 is a partial cross-sectional view of the rotor cup 80 of FIG. 8.

FIG. 10 is an end view of the rotor filter 78 shown in FIG. 5.

FIG. 11 is an end view of the manifold 54 shown in FIG. 2.

FIG. 13 is a front elevational view of the connector 122 of FIG. 13.

DESCRIPTION OF THE PREFERRED EMBODIMENT

Figure 2:
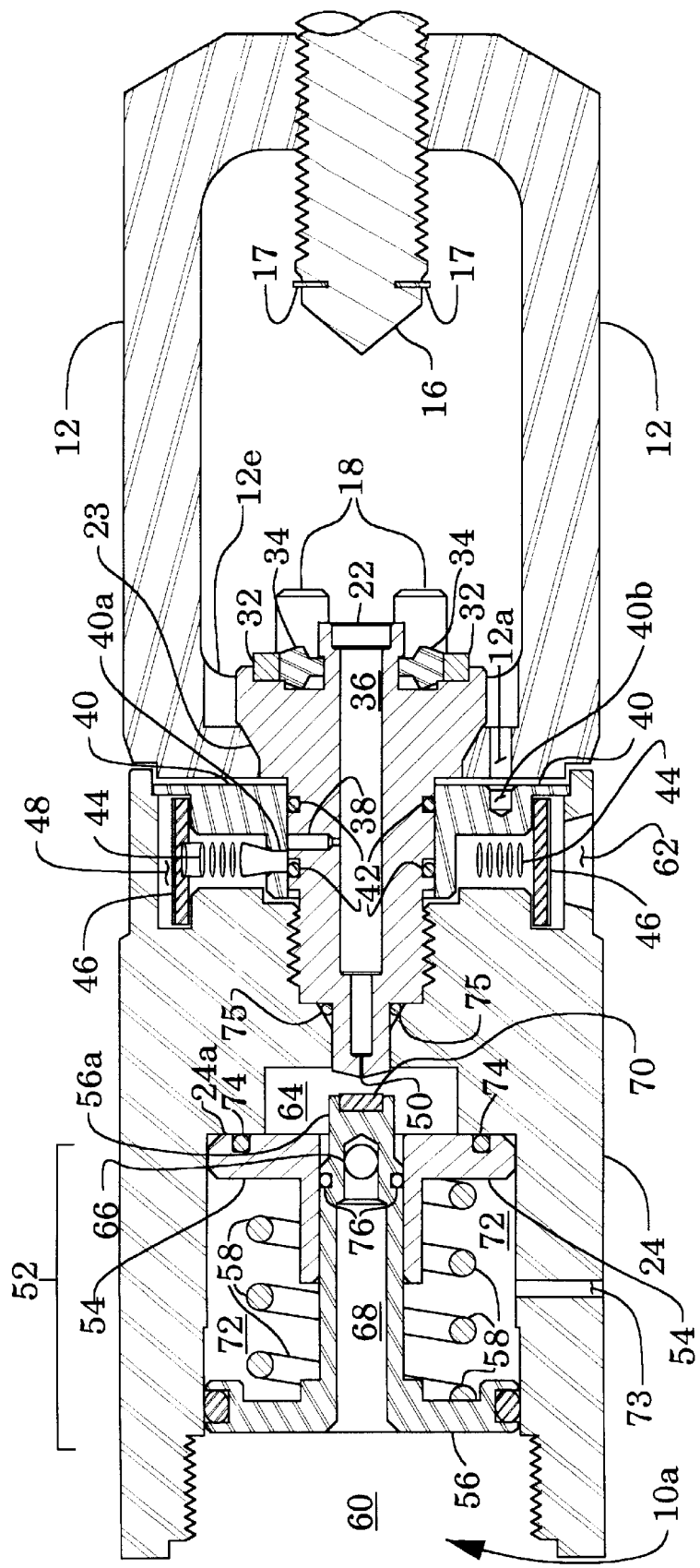
FIG. 2 is a partial cross-sectional view of the device shown in FIG. 1.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, a compressed gas regulator with flow control and internal gauge 10, according to the present invention is show. The regulator 10 includes a yoke portion 12 having an aperture 14 through which a post valve (not shown) is received. A post valve is attached to a high pressure gas tank and provides a convenient and standard quick connect/disconnect mechanism for attaching a regulator to the gas tank. Typically, t-handle 16 is rotated so that yoke 12 is clamped onto the post valve. Dowel pins 18 mate with corresponding holes in the post valve. T-handle 16 is rotated to urge the post valve onto dowel pins 18 and valve seat 20. Valve seat 20, shown in more detail in FIG. 2, includes a metal ring (item 32, FIG. 2) within which a circular rubber seal (item 34, FIG. 2) is attached. C-clip 17 secures t-handle 16 onto yoke portion 12. Compressed oxygen or other gas from a source of high pressure (e.g., a compressed gas tank, not shown) is delivered through the post valve to the connector 22. Compressed gas flows through the yoke portion 12 into the regulator body 24. Within regulator body 24, the pressure from the high pressure tank is reduced and regulated. The regulated gas pressure is then supplied internally via fluid passage, discussed below, to the flow control portion 26 of device 10. Knob 28 provides a convenient mechanism rotatable by the user to select from a variety of gas flow delivery rates. Low pressure gas at a desired or predetermined flow rate is delivered at the fitting 30. The yoke portion 12 provides a mechanism for connection of the device 10 to a standard CGA 870 tank connection. In the embodiment shown, flow meter portion 26 and regulator body portion 24 are cylindrical in cross-section.

Referring now to FIG. 1a, an end view of the device 10, with the t-handle 16 and dowel pins 18 removed, is shown. Yoke portion 12 is primarily shown in this view. Aperture 12c is a threaded hole that receives t-handle 16. Apertures 12b receive dowel pins 18 and are sized so that dowel pins 18 are an interference fit therein. Surface 12d is a flat surface below the valve seat 20 (FIG. 1) that provides mechanical support therefor. Radius undercuts 12e (also shown in FIG. 2) enable mounting of the device 10 on certain CGA standard adapters and are well known in the art.

Referring now to FIG. 2, a cross-sectional view of the device 10 of FIG. 1 is shown with the flow meter portion 26 removed. Although a flow meter 26 is shown attached to device 10 in FIG. 1, the device shown in FIG. 2 may be completed with a cap device that mates with threaded end 10a to provide a pressure regulated source of gas without flow metering control. As in FIG. 1, the yoke portion 12, dowel pins 18, connector 22, t-handle 16 and regulator body 24 are shown. The valve seat 20 includes a metal ring 32 and a rubber gasket 34 that is attached to the inner diameter of metal ring 32. Connector 22 is screwed into regulator body 24, and o-ring seal 75 provides a gas seal therebetween. Compressed gas is supplied to connector 22 and is introduced into passage 36. Passage 38 is in fluid communication with passage 36. Gauge adapter 40 slides over connector 22 and is sized to closely fit over the outer diameter of connector 22 in the area of passage 38. O-rings 42 provide a gas seal between gauge adapter 40 and connector 22 so that compressed gas flowing in passage 38 will not escape. Compressed gas in passage 38 is channeled into Bourdon tube 44 through aperture 40a in adapter 40. The Bourdon tube 44 is attached to and in fluid communication with fluid aperture 40a with silver solder or the like. The silver solder (not shown) that attaches Bourdon tube 44 into aperture 40a prevents any gas flow out of passage 38 and enables gas flow only into Bourdon tube 44. Bourdon tube 44 receives pressurized gas through passage 38 and aperture 40a. A pressure indicator ring 46 is attached to the outermost coils of Bourdon tube 44 and positioned in the channel 48 defined by the regulator body 24 and the surfaces of gauge adapter 40. Connector 22 includes external threads and mates with regulator body 24. Pressurized gas is also delivered via passage 36 to the small aperture 50 into the pressure reducing portion 52 of regulator body 24. Pressure reducing portion 52 includes a cavity 72 within which a manifold 54, a piston 56 and a spring 58 are situated. Regulated pressure gas is supplied at outlet orifice area 60.

Figure 5:
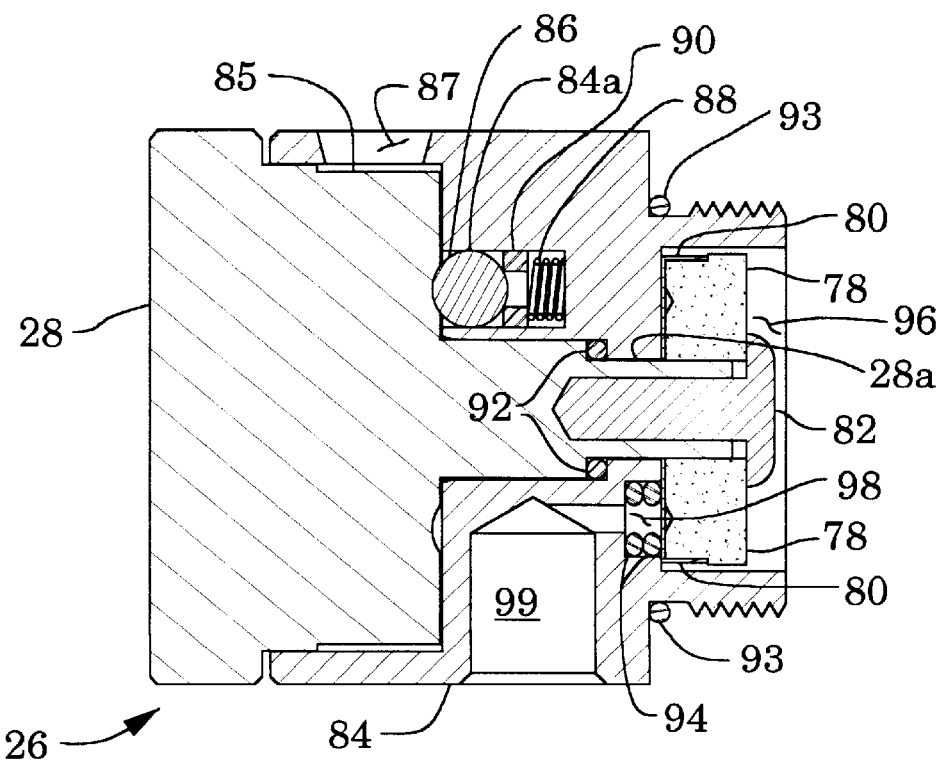
FIG. 5 is a cross-sectional view of the flow meter portion 26 of FIG. 1.

In operation pressurized gas is supplied to passage 36 from a high pressure source. The pressurized gas flows through passage 36 and into passage 50 and passage 38. The gas pressure in passage 38 is communicated to Bourdon tube 44. Bourdon tube 44 rotates about the central axis of connector 22, rotating pressure indicating ring 46 in accordance with the pressure in passage 38. Pressure readings or numerals are inscribed on the outer circumference of pressure indicator ring 46. The readings or numerals are viewable by the user through pressure window 62. Pressurized gas flows through passage 50 into the pressure reducing portion 52. When flow meter 26 (as shown in FIGS. 1 and 5) is threaded onto and sealing the outlet orifice area 60, the piston 56 is captured and mechanically prevented from moving out of the cavity 72. The same would be true with a cap installed at 10a. Piston 56 is shown in its quiescent position assumed when no pressurized gas is present in device 10. Spring 58 is mechanically compressed slightly to a desired compression wherein the spring rate is substantially linear. Piston 56 is mechanically maintained in the position shown by flow meter 26 when flow meter 26 is screwed onto regulator body 24 (as shown in FIG. 1). The movement of piston 56 takes place between the position shown, and piston 56 being urged toward connector 22 so that Teflon insert 70 in tip 56a provides a gas seal against passage 50. Piston 56, spring 58 and manifold 54 coact to regulate pressure supplied at the outlet orifice 60. In particular, pressurized gas travels through aperture or passage 50 into cavity 64. The force of the pressurized gas in cavity 64 causes gas flow over and around the tip 56a of piston 56 and enters the cross-drilled hole 66 in piston 56. Passage 68 is in fluid communication with cross-drilled hole 66 in piston 56 so that gas flowing therethrough is supplied to the outlet orifice 60. An insert 70 is disposed in cavity at tip 56a to provide a gas seal, cutting off gas flow into cavity 64 from passage 50 when piston 56 is urged toward connector 22.

The cooperating action of piston 56, manifold 54 and spring 58 is well known in the art of pressure regulators and described in detail in U.S. Pat. No. 4,655,246 (which discloses a device having very similar internal components) and need not be described in great detail herein. In a quiescent state, spring 58 urges piston 56 away from connector 22 to expose aperture 50. As pressurized gas enters into cavity 64, pressure equalization principles result in gas flow around tip 56a of piston 56 into cross drilled hole 66, through the center of piston 56 and into passage 68 and cavity 60. As pressure equalization between cavity 60 and cavity 64 occurs, forces are exerted by the gas in cavity 60 that overcome the force exerted by spring 58 forcing piston 56 toward connector 22 and sealing aperture 50 closed. When the pressure in cavity 60 falls, as gas flows into the flow meter 26, the force on piston 56 is lessened allowing piston 56 to move toward cavity 60 and uncovering aperture 50, thereby allowing more gas to enter cavity 64. O-ring seal 76 provides a gas seal between piston 56 and manifold 54. The diameter of o-ring seal 76 is smaller than the diameter of piston 56 (adjacent cavity 60) so that excess pressure in cavity 64 forces manifold 54 toward cavity 60, compressing spring 58 slightly, resulting in gas flow from cavity 64 past seal 76, over manifold 54 (see also FIG. 11) into cavity 72 and out pressure vent 73.

When device 10 is attached to a high pressure gas cylinder (not shown) the t-handle 16 is rotated to secure the device onto the cylinder. When device 10 is not attached to a gas cylinder, yoke portion 12 is rotatable with respect to regulator body 24. When t-handle 16 is tightened, the tapered portion of yoke 12 is urged onto the tapered portion of connector 22 at location 23, and yoke 12 becomes rotationally fixed with respect to regulator body 24. Rotation of the yoke portion 12 with respect to the regulator body 24 is desirable so that the pressure window or viewport 62 is positioned as desired by the user.

Figure 3A:
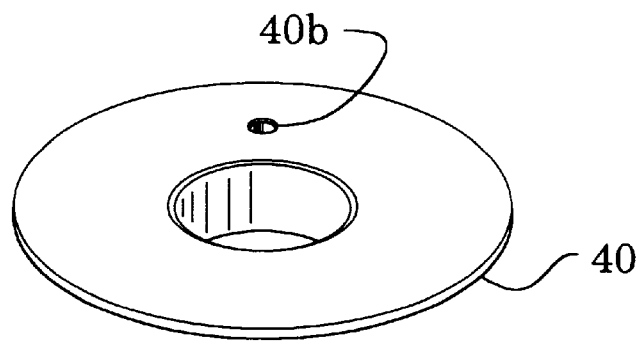
FIG. 3a is an isometric view of the gauge adapter 40 of FIG. 2.
Figure 3B:
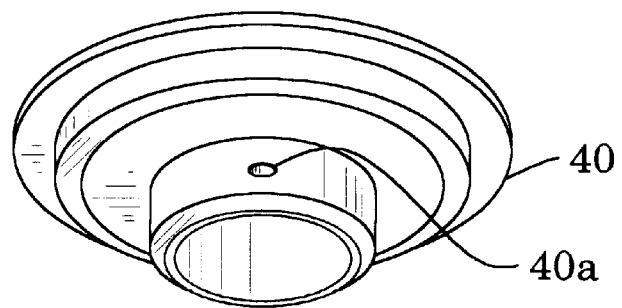
FIG. 3b is an isometric view of the gauge adapter 40 of FIG. 2.
Figure 3C:
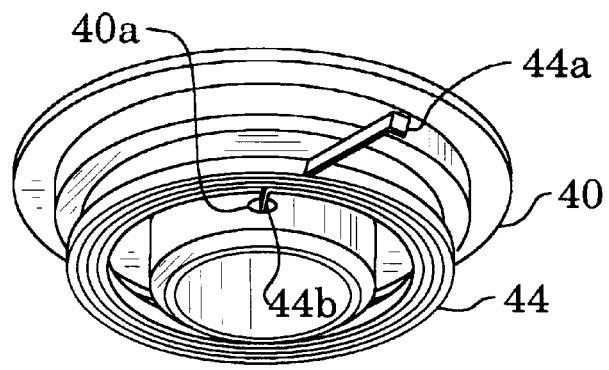
FIG. 3c is an isometric view of the gauge adapter of FIG. 3a shown with the Bourdon tube 44 mounted thereon.

Referring now to FIG. 3a, 3b and 3c, gauge adapter 40 is shown in isometric view, and in FIG. 3c Bourdon tube 44 is shown attached to the gauge adapter 40. Bourdon tube 44 is sealed at end 44a and in fluid communication at end 44b with aperture 40a. A sealant such as silver solder, epoxy, or other known adhesives useful in high pressure sealing conditions, is applied into aperture 40a so that gas traveling through aperture 40a enters only into Bourdon tube 44 and is not lost to the surrounding atmosphere. Aperture 40b, shown in FIG. 3a, provides a mechanism by which a dowel or pin may be inserted though yoke portion 12 and aperture 12a (see FIG. 2) so that the gauge adapter 40 may be rotated with respect to the regulator body 24 to "zero" or calibrate the pressure indicator ring 46.

Figure 4:
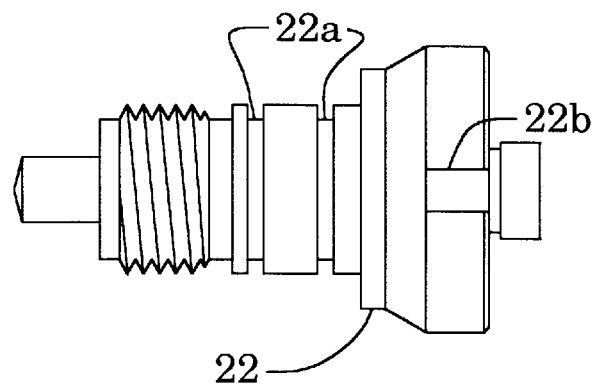
FIG. 4 is a front elevational view of the connector 22 of FIG. 2.

Referring now to FIG. 4, a front elevational view of connector 22 is shown. Groove 22a provides a location wherein o-rings 42 are situated. A notch 22b and a corresponding symmetrically located notch (not shown) provide a mechanical connection point wherein a spanner wrench may grip connector 22 for screwing the connector 22 into regulator body 24.

Referring now to FIG. 5, a cross-sectional view of the flow meter portion 26 of FIG. 1 is shown. The flow meter 26 includes a knob 28, a rotor filter 78 made from sintered metal and a rotor cup stamped from sheet metal, preferably brass. Rotor filter 78 and rotor cup 80 are positioned over knob extension 28a. Screw 82 secures rotor filter 78 and rotor cup 80 to knob extension 28a. Rotor cup 80 is maintained adjacent flow meter body 84 by the spring forces asserted on knob 28 by springs 88. A locking substance, such as nylon, is applied to the threads of screw 82 to prevent the screw from loosening over time. Knob 28 is rotatable within flow meter body 84. Ball bearings 86, springs 88 and bearing rings 90 (three of each are present in device 10, their locations shown in FIG. 7) provide a detent rotation mechanism against which knob 28 acts when rotated. Spring 88 and bearing ring 90 urge ball bearing 86 into knob 28 to create the detent action upon rotation of knob 28. Rings 90 are preferably made of nylon or Teflon and prevent ball bearings 86 from contacting springs 88 which would result in metallic particle generation within the flow meter device. O-ring seal 92 provides a gas seal between knob 28 and flow meter body 84 and also provides a shock absorber therebetween. O-rings 94 provide a gas seal between rotor cup 80 and flow meter body 84. Flow rate numerals (not shown) are embossed onto the periphery of knob 28 at location 85. A viewport 87, that is oval in shape, enables the user to view the flow rate numerals embossed on the knob 28.

Operationally, pressurized gas is supplied into the cavity area 96 when the flow meter 26 is attached (threaded onto) to the regulator shown in FIG. 2. Outlet orifice 60 provides regulated gas pressure to cavity 96. Pressurized gas passes through rotor filter 78 and through one of a plurality of small apertures in rotor cup 80 (shown in FIG. 8) and into fluid passage 98. Passage or aperture 98 is in fluid communication with the drilled and threaded cavity 99, wherein a fitting adapter (item 30 in FIG. 1) is attached or screwed into flow meter body 84. Regulated and flow controlled gas is thus supplied to cavity 99.

In the preferred embodiment, regulator body 24, yoke portion 12, manifold 54, piston 56, knob 28, gauge adapter 40 and flow meter body 84 are made from aluminum and subsequently anodized to provide a hardened durable surface for each. Connector 22 is made from brass to resist ignition in the event that the cylinder valve is suddenly opened causing adiabatic compression of the oxygen to 2000 psi resulting in the incoming oxygen temperature rising above 1000 degrees Fahrenheit.

Referring now to FIG. 6, an end view of knob 28 is shown with portion 28a viewable. Detents 28b are shown which coact with ball bearings 86 to provide detent action upon rotation of knob 28. Two flats 28c are formed in knob portion 28a. The flats 28c mechanically engage the inner rectangular apertures of rotor filter 78 and rotor cup 80.

Referring now to FIG. 7, an end view of the flow meter body 84 is shown. The cavities 84a, arranged in 120 degree offsets from each other, each hold a ball bearing 86, a spring 88 and a ring 90. Aperture 98 and apertures 99, all shown by broken lines, are located on the back side of the flow meter body 84, and in 120 degree offset positions from one another. Aperture 98 and apertures 99 each have two o-rings inserted therein as typified by FIG. 5 with respect to aperture 98. Only aperture 98 provides a flow path for gas to flow out of the internal area of flow meter body 84.

Referring now to FIG. 8, the rotor cup 80 of FIG. 5 is shown in more detail. Arranged about the periphery of rotor cup 80 are eleven indentations 80a. Centrally located in each of the indentations 80a are apertures 80b, that extend through rotor cup 80. Rectangular aperture 81 mates with the flats 28c of the knob 28 shown in FIG. 6. Each of the indentations is a coined surface and shown in more detail in FIG. 9. The coining of the surface of rotor cup 80 prevents the o-rings 94 (FIG. 5) from contacting the sharp edges of the apertures 80b, extending the life expectancy of the flow meter 26.

Referring now to FIG. 9, a partial cross-sectional view of the rotor cup 80, looking in the direction of the arrows labeled A—A, of FIG. 8 is shown. The recessed portion 80a surrounding the holes 80b prevents or lessens the contact between the holes 80b and the o-rings 94. The apertures 80b may be drilled, punched or laser cut into rotor cup 80.

Referring now to FIG. 10, a front elevational view of the rotor filter 78 is shown. A recessed groove 78a, triangular in cross-section, is located at a radius that corresponds with the radius of holes 80b in rotor cup 80. Gas flowing through the rotor filter 78 is delivered readily to any of the apertures 80b positioned over the groove 78a, and material that might clog a portion of rotor filter 78 cannot clog the entire filter. Only one of the apertures 80b has air flowing through it at one time, that is, the aperture 80b positioned over aperture 98. Rectangular aperture 78b mates with and receives knob stem 28a, as does aperture 81 in rotor cup 80, so that the rotor cup 80 and rotor filter 78 rotate in unison with knob 28. Rotor cup 80 is sized so that the cup portion (shown in FIG. 5) is a small interference fit over the outer diameter of rotor filter 78.

Referring now to FIG. 11, an end view of manifold 54 is shown. Six flats 54a are located on the outer periphery of manifold 54 so that gas flow past the manifold occurs when surface 54b is not in contact with surface 24a of FIG. 2. Groove 54c receives o-ring 74, as shown in FIG. 2.

Figure 12:
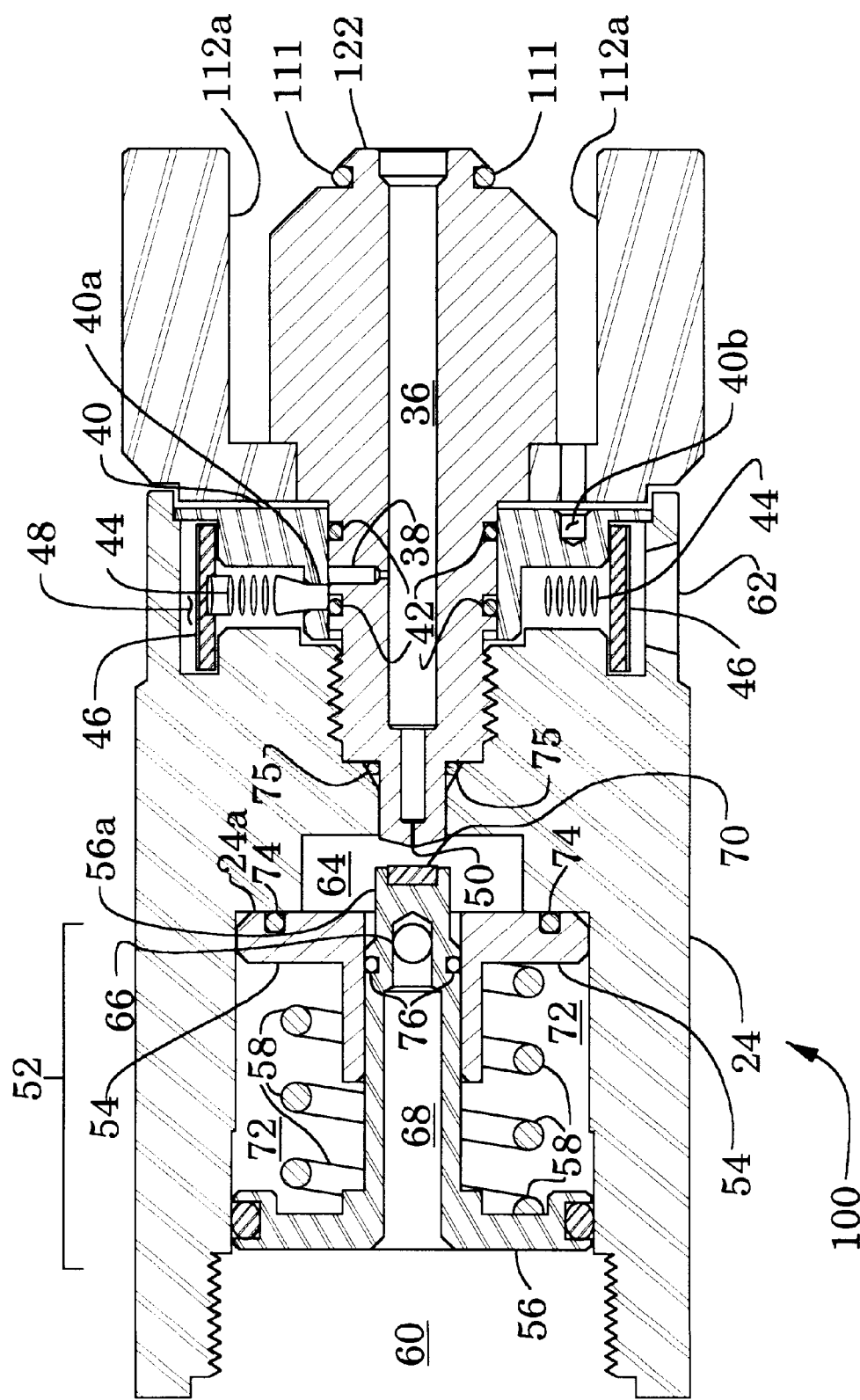
FIG. 12 is cross-sectional view of another embodiment of the gas regulator with internal gauge according to the present invention.

Referring now to FIG. 12, an alternate embodiment of the regulator device with flow control and internal gauge 100 according to the present invention is shown. Like components in FIG. 2 are number the same in FIG. 12, and their features and functionality are identical. The sole difference between FIG. 2 and FIG. 12 are the connector 122 and the tank adapter portion 112, which replace connector 22 and yoke portion 12, respectively. Connector 122 is shaped to connect to a CGA standard 540 "nut-and-nipple" high pressure connector on a high pressure gas cylinder (not shown). O-ring 111 provides a gas seal between connector 122 and the mating CGA connection. Adapter portion 112 is cylindrical in cross-section and includes threads on the internal surface at 112a. Adapter portion 112 is rotatable with respect to regulator body 24 when the device 100 is not attached to a gas cylinder. When attached to a cylinder, adapter 112 is urged against connector 122 to maintain the position of the adapter 112 with respect to the regulator body 24. In all other aspects, device 100 functions exactly as device 10 of FIG. 2.

Referring now to FIG. 13, a front elevational view of the connector 122 is shown. Groves 122a provide a receptacle within which o-rings are disposed, as shown in FIG. 12. Grove 122b provides a receptacle for o-ring 111. Adapter 122 is substantially cylindrical in cross-section and made from brass to lessen ignition potential when adiabatic compression of oxygen occurs.

While the invention has been illustrated and described in detail in the drawings and foregoing description of the preferred embodiment, the same is to be considered as illustrative and not restrictive in character, it being understood that only the preferred embodiment has been shown and described and that all changes and modifications that come within the spirit of the invention are desired to be protected.

What is claimed is:

1. A flow meter apparatus comprising:

a flow meter body having a flow inlet, a disk cavity in fluid communication with said flow inlet, said flow meter body also including a flow outlet, said flow meter body further including a flow meter fluid passage in fluid communication with said flow inlet and said flow outlet, and said flow meter body including a knob aperture that fluidly communicates with said disk cavity;

a knob having a protrusion, wherein said protrusion is inserted into said knob aperture and extends into said disk cavity of said flow meter body;

filter means disposed in said flow disk cavity for filtering gas that flows into said flow disk cavity from said flow inlet;

a flow disk attached to said protrusion of said knob and disposed in said disk cavity, said flow disk having a plurality of apertures therein, wherein said plurality of apertures in said flow disk are rotatably positionable adjacent said flow meter fluid passage in accordance with the rotational position of said knob;

flow seal means disposed between said flow meter fluid passage and said flow disk to provide a gas seal between said flow disk and one of said plurality of apertures in said flow disk; and knob seal means for providing a gas seal between said protrusion and said knob aperture.

wherein said flow disk is circular and is formed from sheet metal, and said plurality of apertures are situated at a fixed radius from the center of said flow disk, said flow disk including a retaining means situated at the outer radius of said flow disk for receiving and attaching said flow disk to said filter means, and wherein said filter means is situated adjacent to and attached to said flow disk by said retaining means.

2. The device of claim 1 wherein said filter means is a filter disk made from sintered metal, and wherein said filter disk includes a circular groove on one of the circular faces of said filter disk, said circular groove having a radius corresponding to the fixed radius of said plurality of apertures in said flow disk, said flow disk arranged so that said circular groove is positioned adjacent said flow disk.

3. The device of claim 2 including detent means having a portion situated on said knob and a portion situated on said flow meter body, said detent means providing a rotational detent mechanism between said knob and said flow meter body, said detent means aligning one of said plurality of apertures in said flow disk with said flow seal means at each detent location.

4. The device of claim 3 wherein said plurality of apertures in said flow disk vary in size to provide a plurality of user selectable flow rates.

5. The device of claim 4 wherein each of said plurality of apertures is surrounded by one of a plurality of recesses, and wherein said flow seal means is an o-ring disposed adjacent and in contact with said flow disk, and wherein said plurality of recesses displaces said plurality of apertures away from said o-ring.

6. A flow meter device comprising:

a body having a knob aperture, an inlet aperture, an outlet aperture, a fluid passage connecting said inlet aperture and said outlet aperture, and wherein said knob aperture is in fluid communication with said inlet aperture;

knob having a protrusion, wherein said protrusion is disposed in said knob aperture and wherein said protrusion extends into said disk cavity of said flow meter body;

knob seal means for providing a gas seal between said protrusion and said knob aperture;

a flow disk disposed in said inlet aperture and attached to said protrusion of said knob, said flow disk having a plurality of apertures arranged at a fixed radius from the center of said flow disk, wherein said plurality of apertures in said flow disk are rotatably positionable adjacent said fluid passage in accordance with the rotational position of said knob; and a fluid seal disposed in said inlet aperture and abutting said flow disk so that said fluid seal provides a gas seal between one of said plurality of apertures in said flow disk and the location where said fluid passage communicates with said inlet aperture, including particulate filter means disposed in said inlet aperture for filtering particulates from the gas flowing into said inlet aperture, wherein said flow disk is circular and is formed from sheet metal, said flow disk including a retaining means situated at the outer radius of said flow disk for receiving and attaching said flow disk to said particulate filter means, and wherein said particulate filter means is situated to and attached to said flow disk by said retaining means.

7. The device of claim 6 wherein said filter means is a filter disk made from sintered metal.

8. The device of claim 7 wherein said plurality of apertures in said flow disk vary in size to provide a plurality of user selectable flow rates.

9. The device of claim 8 wherein each of said plurality of apertures is surrounded by one of a plurality of recesses, and wherein said fluid seal is an o-ring disposed adjacent and in contact with said flow disk, and wherein said plurality of recesses displaces said plurality of apertures away from said o-ring.

10. The device of claim 9 wherein said particulate filter means is a sintered metal disk that includes a circular groove on one of the circular faces of said sintered metal disk, said circular groove having a radius corresponding to the fixed radius of said plurality of apertures in said flow disk, and wherein said sintered metal disk is adjacent said flow disk and disposed so that said circular groove is positioned over and immediately adjacent said plurality of apertures.

11. The device of claim 10 including detent means having a portion situated on said knob and a portion situated on said flow meter body, said detent means providing a rotational detent mechanism between said knob and said flow meter body, said detent means aligning one of said plurality of apertures in said flow disk with said fluid seal at each detent location.

* * * * *